United States Patent
Prasad

(10) Patent No.: US 9,943,859 B2
(45) Date of Patent: Apr. 17, 2018

(54) ELECTROMECHANICAL WATER SEPARATOR

(71) Applicant: Hamilton Sundstrand Corporation, Windsor Locks, CT (US)

(72) Inventor: Dilip Prasad, North Granby, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 147 days.

(21) Appl. No.: 14/957,013

(22) Filed: Dec. 2, 2015

(65) Prior Publication Data
US 2017/0157621 A1  Jun. 8, 2017

(51) Int. Cl.
*B03C 3/017* (2006.01)
*B01D 45/08* (2006.01)
*B01D 45/16* (2006.01)

(52) U.S. Cl.
CPC ............ *B03C 3/0175* (2013.01); *B01D 45/08* (2013.01); *B01D 45/16* (2013.01)

(58) Field of Classification Search
CPC combination set(s) only.
See application file for complete search history.

(56) References Cited

U.S. PATENT DOCUMENTS

| | | |
|---|---|---|
| 3,197,946 A | 8/1965 | Taylor |
| 3,266,227 A | 8/1966 | Plizak et al. |
| 3,266,228 A | 8/1966 | Plizak et al. |
| 3,834,126 A | 9/1974 | DiMinno, Jr. |
| 3,869,266 A | 3/1975 | Rannenberg |
| 4,010,011 A * | 3/1977 | Reif .................. B03C 3/15 96/61 |
| 4,302,934 A | 12/1981 | Wynosky et al. |
| 4,401,269 A | 8/1983 | Eiler |
| 4,670,026 A * | 6/1987 | Hoenig .................. B03C 3/16 55/DIG. 38 |
| 4,886,528 A | 12/1989 | Aaltonen et al. |
| 5,600,965 A | 2/1997 | Jan et al. |
| 5,761,900 A * | 6/1998 | Presz, Jr. .................. F02K 1/36 239/265.17 |

(Continued)

FOREIGN PATENT DOCUMENTS

| | | | | |
|---|---|---|---|---|
| EP | 2927504 A1 * | 10/2015 | ................ | F02C 7/30 |
| EP | 3091288 A1 * | 11/2016 | .............. | F23R 3/286 |

(Continued)

OTHER PUBLICATIONS

Extended European Search Report for EP Application No. 16201318.9, dated Apr. 11, 2017, 7 pages.

*Primary Examiner* — Christopher P Jones
*Assistant Examiner* — Sonji Turner
(74) *Attorney, Agent, or Firm* — Kinney & Lange, P.A.

(57) ABSTRACT

A water separator comprises an axially extending airflow passage, an airflow mixer, a plurality of electric plates of alternating charge, and a mechanical separator. The airflow mixer, the plurality of electric plates, and the mechanical separator are disposed within the airflow passage. The airflow mixer imparts a non-axial flow component on airflow through the airflow passage. The electric plates are situated downstream of the mixer, and create an electric field region within the airflow passage. The mechanical separator is situated at or downstream of the electric field region, and is disposed to separate water droplets from air.

14 Claims, 3 Drawing Sheets

(56) References Cited

U.S. PATENT DOCUMENTS

| | | | |
|---|---|---|---|
| 7,527,675 B2 | 5/2009 | Bertuccioli et al. | |
| 7,883,558 B2 | 2/2011 | Gottung et al. | |
| 8,424,279 B2 * | 4/2013 | Rajamani | B01D 45/14 |
| | | | 415/122.1 |
| 9,061,290 B1 * | 6/2015 | Brown, II | B03C 3/017 |
| 9,546,603 B2 * | 1/2017 | Meier | F02C 7/30 |
| 2010/0323601 A1 * | 12/2010 | Cremers | B64D 13/06 |
| | | | 454/76 |
| 2011/0126512 A1 * | 6/2011 | Anderson | F02K 1/386 |
| | | | 60/262 |
| 2011/0179763 A1 | 7/2011 | Rajamani et al. | |
| 2011/0265447 A1 * | 11/2011 | Cunningham | F02K 1/48 |
| | | | 60/264 |
| 2013/0239806 A1 * | 9/2013 | Landreth | B03C 3/013 |
| | | | 95/58 |
| 2015/0090120 A1 * | 4/2015 | Au | B03C 9/00 |
| | | | 95/70 |
| 2016/0326962 A1 * | 11/2016 | Wysocki | F23R 3/286 |

FOREIGN PATENT DOCUMENTS

| | | |
|---|---|---|
| FR | 2990142 A1 | 11/2013 |
| WO | WO2010054074 A1 | 5/2010 |

\* cited by examiner

ELECTROMECHANICAL WATER SEPARATOR

BACKGROUND

The present invention relates generally to dehumidification systems, and more particularly to a water separator for aircraft cabin air dehumidification.

Aircraft cabin environmental control systems typically include dehumidification equipment to remove water from ingested atmospheric air. Dehumidification is of particular concern at lower altitudes, and/or while aircraft are grounded. Dehumidification systems for aircraft cabin air commonly include coalescer bags and/or air mechanical swirlers situated in annular passages to coalesce and separate water from air. These systems more readily separate out large water droplets than fine, mist-like droplets. At lower pressures and higher humidities, airborne water tends to form very small droplets that are difficult to efficiently separate and remove from air.

SUMMARY

In one aspect, the present invention is directed toward a water separator comprising an axially extending airflow passage, an airflow mixer, a plurality of electric plates of alternating charge, and a mechanical separator. The airflow mixer, the plurality of electric plates, and the mechanical separator are disposed within the airflow passage. The airflow mixer imparts a non-axial flow component on airflow through the airflow passage. The electric plates are situated downstream of the mixer, and create an electric field region within the airflow passage. The mechanical separator is situated at or downstream of the electric field region, and is disposed to separate water droplets from air.

An another aspect, the present invention is directed toward an environmental control system comprising an air intake, an annular air passage, and an electric field region and a mechanical separator situated within the annular air passage. The air passage extends along an axis from the air intake towards an air outlet. The electric field region comprises a plurality of electric plates of alternating charge. The mechanical separator is situated at or downstream of the electric field region, and is disposed to centrifugally separate water droplets from axial airflow.

In yet another aspect, the present invention is directed toward a method of separating water from humid air by flowing air axially through an annular air passage, introducing a non-axial flow component to airflow through the annular air passage via a mechanical mixer, polarizing and thereby coalescing water droplets downstream of the mechanical mixer via an electric field region produced by a plurality of plates of alternating electric charge, and mechanically separating coalesced water droplets via a mechanical swirler.

The present summary is provided only by way of example, and not limitation. Other aspects of the present disclosure will be appreciated in view of the entirety of the present disclosure, including the entire text, claims, and accompanying figures.

Figure 1:
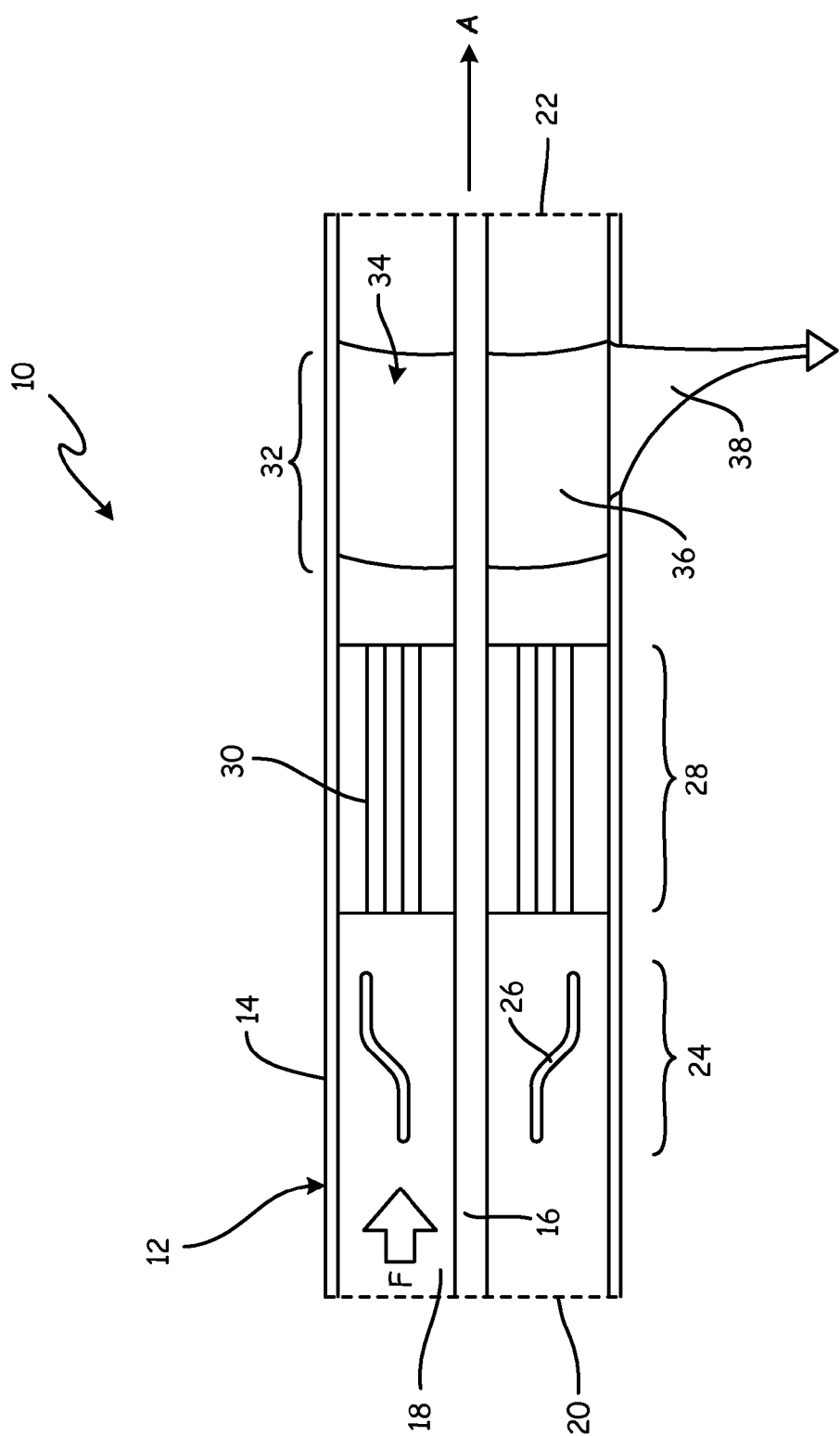
FIG. 1 is a schematic view of a water separator.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention concerns an electromechanical water separator with annular separator passage containing an electrical field region upstream of or coincident with a mechanical swirler. The field region is formed by a plurality of distributed plates with alternating electrical charge. These plates create an electric field that polarizes electrically neutral water droplets, promoting water coalescence into fewer, larger droplets. This reduces the length and/or flow losses of the mechanical swirler apparatus required for water separation, and/or improves separation for a given swirler structure, allowing efficient water separation even at low pressures and high humidities.

FIG. 1 is a schematic view of water separator 10, an electromechanical separator for dehumidification. Water separator 10 can, for example, be a dehumidification section of an aircraft environmental control system. Water separator 10 includes airflow guide 12 (made up of air tube 14 and inner axis 16, which together define annular passage 18 from air inlet 20 to air outlet 22), mixer section 24 with lobed mixer 26, electric field region 28 with electric plates 30, and mechanical separator 32 with swirler 34 (having turning vanes 36) and water outlet 38. Annular passage 18 is an air pipe that carries humid air flow F substantially along a flow axis A, through mixer section 24, electric field region 28, and mechanical separator 32. Although mechanical separator 32 is depicted as downstream of electric field region 28, some embodiments of the present invention can situate mechanical separator 32 at least partially within electric field region 28, as described below with respect to FIG. 4. Outer tube 14 and inner axis 16 of airflow guide 12 define the bounds of annular passage 18, constraining and directing air flow F while supporting the internal structure of mixer section 24, electric field region 28, and mechanical separator 32.

Mixer section 24 is a turbulating section with at least one mixing element disposed within annular passage 18 to impart a non-axial component on air flow F. In the depicted embodiment, mixer section 24 includes lobed mixer 26, an annular, wave-shaped guide plate. This plate has substantially uniform radius at an upstream end, but varies substantially in radius as a function of circumferential position at its downstream end. This variation in radius introduces pressure differences based on radial and circumferential position at a downstream end of lobed mixer 26, causing eddies and swirls in air flow F. In alternative embodiments, other types of annular mixers can replace lobed mixer 26. Although only one lobed mixer 26 is shown, mixer section 24 can include any number of distinct mixing elements suited to provide a desired level of air flow turbulation.

Electric field region 28 is an axial region of annular passage 18 containing electric plates 30. Electric plates 30 are alternating charged plates, i.e. each electric plate 30 has opposite charge to adjacent electric plates, as described in further detail below. In particular, all electric plates 30 carry charge of approximately equal magnitude, with adjacent plates carrying charges of opposite sign. Electric plates 30 are energized by an external power source (not shown). Electric plates 30 can be shaped and arranged in several ways, as described below with respect to FIGS. 2-4. In general, electric plates 30 create an electric field within electric field region 28 that polarizes water droplets within humid air flow F. Even where water within humid air flow F is substantially electrically neutral, polarization will promote attraction between droplets, causing fine droplets to coalesce into fewer, larger droplets.

Mechanical separator 32 is a stationary mechanical structure disposed within annular passage 18 to separate water droplets from air. In the depicted embodiment, mechanical separator 32 includes swirler 34, a centrifugal separator with turning vanes 36. As water droplets within humid air flow F impinge on turning vanes 36 of swirler 34, dry air is able to flow substantially unimpeded in a generally axial direction, while the heavier water droplets are centrifugally deflected radially outward towards water outlet 38. Larger water droplets are more strongly deflected, and the large droplet sizes promoted by electric field region 28 consequently improve the efficiency of mechanical separator 32 at separating water from air within humid air flow F. This function is particularly essential when water separator 10 operates in low pressure environments, where water droplets within fluid flow F would tend to be too fine for a conventional mechanical system to efficiently separate. Although only one swirler 34 is depicted in FIG. 1, some embodiments of water separator 10 can include several stages of a separator apparatus. In general, droplet coalescence from electric field region 28 will tend to reduce the number and/or extent and/or degree of flow turning of swirlers 34 or analogous structures required to reliably reduce air humidity at air outlet 22 to a desired level.

Figure 2:
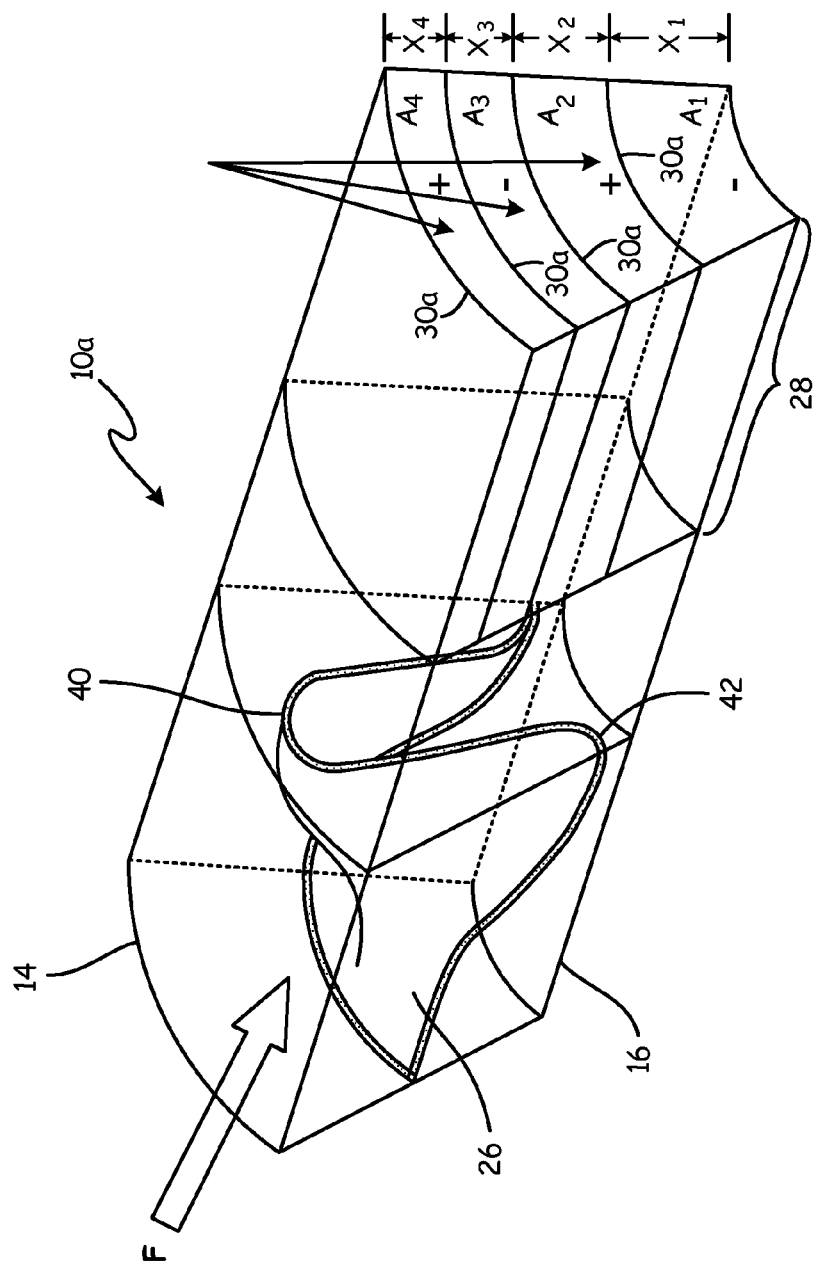
FIG. 2 is a perspective view of an arcuate section of an embodiment of a portion of the water separator of FIG. 1.
Figure 3:
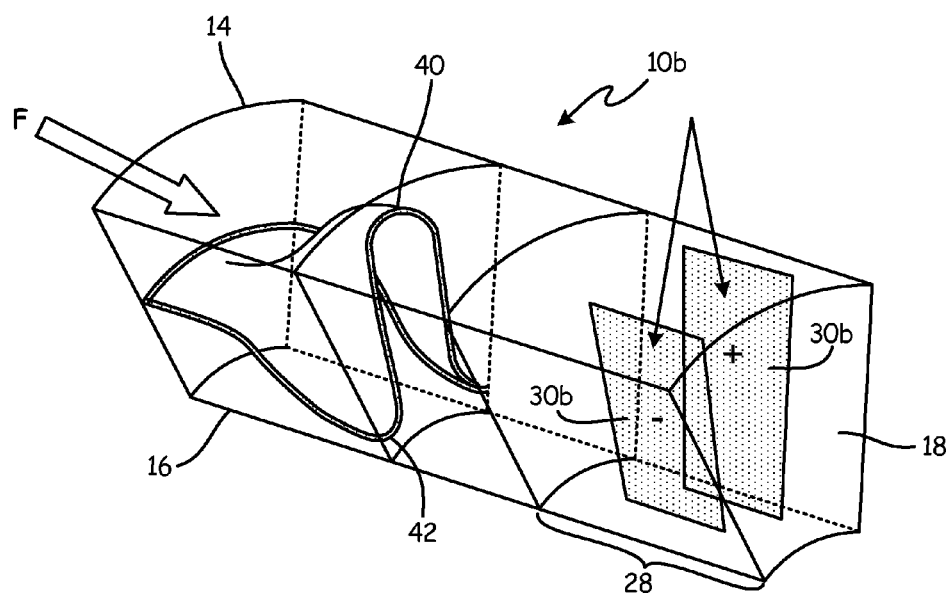
FIG. 3 is a perspective view of an arcuate section of another embodiment of a portion of the water separator of FIG. 1.
Figure 4:
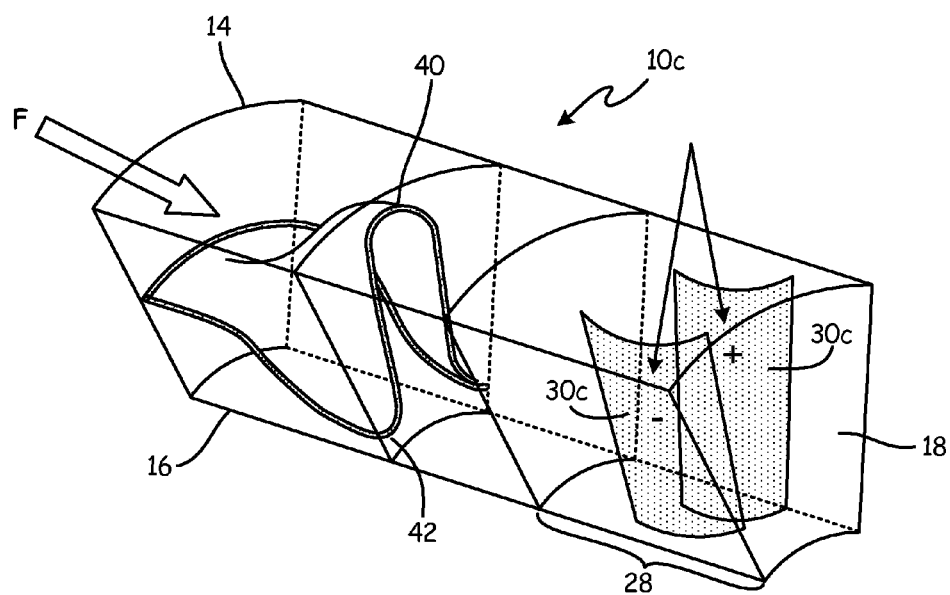
FIG. 4 is a perspective view of an arcuate section of yet another embodiment of a water separator.

FIGS. 2, 3, and 4 are perspective views of arcuate sections of a region of annular passage 18 passing through mixer section 24 and electric field region 28 of three embodiments water separator 10, labeled water separators 10a, 10b, and 10c, respectively. FIGS. 2, 3, and 4 all illustrate air tube 14, inner axis 16, annular passage 18, lobed mixer 26 (with peak 40 and trough 42), and field region 28. Water separators 10a, 10b, and 10c differ within electric field region 28.

Lobed mixer 26 operates as described above with respect to FIG. 2, and has downstream peaks and troughs 40 and 42, respectively, that introduce a non-axial component to air flow F.

Electric field region 28 of FIG. 2 includes charged plates 30a, a plurality of concentric annular plates of alternating electric charge; i.e. each interior annular plate 30a has charge of opposite sign to plates radially inboard and outboard of it, with radially innermost and outermost charged plates 30a situated at inner axis 16 and air tube 14, respectively. In at least some embodiments, the radial spacing $x_1$, $x_2$, etc. between adjacent annular plates 30a is unequal, and is selected to ensure that the corresponding cross-sectional area $A_1$, $A_2$, etc. between plates is constant between each set of adjacent annular plates 30a. This arrangement of annular plates 30a ensures that electric fields within electric field region 28 are substantially uniform, but for fringing effects. Consequently, a desired level of coalescence can be promoted uniformly throughout electric field region 28 via a known axial length and charge strength of charged plates 30a. In general, the uniformity of electric field within electric field region 28 enables more efficient water separation by providing a desired level of electric field exposure across all areas of electric field region 28 without wasted energy going towards higher field exposure than necessary in any area. Charged plates 30a can be of odd or even number.

Electric field region 28 of FIG. 3 includes charged plates 30b, a plurality of circumferentially distributed flat walls or vanes extending radially from inner axis 16 to air tube 14. In the depicted embodiment, charged plates 30b are substantially uniformly circumferentially distributed about inner axis 16. The circumferentially closest neighbors of each charged plate 30b have opposite charge; accordingly, electric field region 28 includes an even number of charged plates 30b. The plate geometry of FIG. 3 produces non-uniform electric fields within electric field region 28. In some embodiments, each charged plate 30b carries a fixed radius-independent charge, and electric field strength within electric field region 28 accordingly falls as a function of radius. In alternative embodiments, each charged plate 30b can comprise a plurality of distinct, radially stacked elements of increasing charge as a function of radial position, identical in magnitude to all other charged plates 30b. Uniformly charged embodiments of charged plates 30b are simpler to manufacture and maintain, while radially staged charge embodiments can produce more uniform electric fields within electric field region 28.

Electric field region 28 of FIG. 4 includes charged plates 30c, which differ from charged plates 30b only in airflow contour. Where charged plates 30b are depicted as flat, radially extending walls, charged plates 30c are pitched and/or curved turning vanes that double as charged plates to produce electric field region 28. In water separator 10c, mechanical separator 32 overlaps at least partially with electric field region 28, with at least some charged plates 30c doing double duty as turning vanes 36 of swirler 34. Some embodiments of water separator 10c can dispense altogether with a separate swirler 34, with charged plates 30c acting as the sole turning vanes of mechanical separator 32. In other embodiments, charged plates 30c form only a subset of the turning vanes of mechanical separator 32. Water separator 10c is exceptionally compact, although humid air flow F impinging upon turning vanes/charged plates 30c at the upstream end of electric field region will experience relatively little coalescence, with correspondingly reduced efficiency benefit.

Although charged plates 30a, 30b, and 30c have been described as separate embodiments of charged plates 30, some embodiments of the present invention can incorporate both a first set of radially distributed annular plates (as per charged plates 30a) and a second set of circumferentially distributed, radially extending plates (as per charged plates 30b or 30c). These sets of charged plates 30 can be arranged axially in flow series, or can be axially overlapping or coincident. In all such embodiments, the sign of charges of adjacent charged plates 30 within each set is opposite.

In all embodiments, electric field region 28 promotes coalescence of water droplets within turbulated humid air flow F from mixer section 24, thereby enhancing separation efficiency of mechanical separator 32 by increasing droplet size.

Discussion of Possible Embodiments

The following are non-exclusive descriptions of possible embodiments of the present invention.

A water separator comprises: an axially extending airflow passage; an airflow mixer disposed within the airflow passage, and configured to impart a non-axial flow component on airflow through the airflow passage; a plurality of electric plates of alternating charge, disposed within the airflow passage downstream of the airflow mixer so as to create an electric field region within the airflow passage; and a mechanical separator disposed within the airflow passage, downstream of the airflow mixer and axially at or downstream of the electric field region, disposed to separate water droplets from air.

The water separator of the preceding paragraph can optionally include, additionally and/or alternatively, any one or more of the following features, configurations and/or additional components:

A further embodiment of the foregoing water separator, wherein the electric plates are radially distributed annular plates.

A further embodiment of the foregoing water separator, wherein the electric plates are radially distributed such that cross-sectionals area between adjacent plates are the same.

A further embodiment of the foregoing water separator, wherein the electric plates are radially extending, circumferentially distributed vanes.

A further embodiment of the foregoing water separator, wherein the vanes are flow turning elements of the mechanical separator.

A further embodiment of the foregoing water separator, wherein the electric plates comprise a first plurality of radially extending, circumferentially distributed plates of alternating charge, and a second plurality of annular, radially distributed plates of alternating charge.

A further embodiment of the foregoing water separator, wherein the mechanical separator is a swirler with a plurality of circumferentially distributed flow turning elements disposed to centrifugally separate water droplets from air.

A further embodiment of the foregoing water separator, wherein the airflow mixer is a lobed mixer with an annular wave-shaped guide plate having a substantially uniform upstream radius and a downstream radius that varies as a function of radial position.

An environmental control system comprising: an air intake; an annular air passage extending along an axis from the air intake toward an air outlet; an electric field region disposed within the annular air passage, and comprising a plurality of electric plates of alternating charge; and a mechanical separator disposed within the annular air passage, axially at or downstream of the electric field region, and disposed to centrifugally separate water droplets from axial airflow.

The environmental control system of the preceding paragraph can optionally include, additionally and/or alternatively, any one or more of the following features, configurations and/or additional components:

A further embodiment of the foregoing environmental control system, further comprising: a mechanical airflow mixer disposed within the annular air passage, downstream of the air intake and upstream of the electrical field region, and configured to introduce a non-axial flow component to airflow through the annular passage.

A further embodiment of the foregoing environmental control system, wherein the mechanical separator comprises at least one stage of a plurality of stationary, circumferentially distributed turning vanes.

A further embodiment of the foregoing environmental control system, wherein the electric plates are annular, radially distributed plates of alternating charge.

A further embodiment of the foregoing environmental control system, wherein the electric plates are circumferentially distributed, radially extending plates of alternating charge.

A method of separating water from humid air, the method comprising: flowing air axially through an annular air passage; introducing a non-axial flow component to airflow through the annular air passage via a mechanical mixer; polarizing and thereby coalescing water droplets downstream of the mechanical mixer via an electric field region produced by a plurality of plates of alternating electric charge; and mechanically separating coalesced water droplets via a mechanical swirler.

The method of the preceding paragraph can optionally include, additionally and/or alternatively, any one or more of the following features, configurations and/or additional components:

A further embodiment of the foregoing method, wherein polarizing water droplets comprises applying constant direct current of alternating sign to adjacent plates among the plurality of plates of alternating electric charge.

A further embodiment of the foregoing method, wherein polarizing water droplets comprises applying opposite phase alternating current to adjacent plates among the plurality of plates of alternating electric charge.

A further embodiment of the foregoing method, wherein the electric field region is a region of substantially constant electric field as a function of radius.

A further embodiment of the foregoing method, wherein the mechanical swirler includes a plurality of turning vanes, at least a subset of which are among the plurality of plates of alternating electric charge that produce the electric field region.

A further embodiment of the foregoing method, wherein introducing a non-axial component to airflow through the annular air passage comprises redirecting air via a lobed mixer with an annular wave-shaped guide plate having a substantially uniform upstream radius and a downstream radius that varies as a function of radial position.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A water separator comprises:
   an axially extending airflow passage;
   an airflow mixer disposed within the airflow passage, and configured to impart a non-axial flow component on airflow through the airflow passage;
   a plurality of electric plates of alternating charge, disposed within the airflow passage downstream of the airflow mixer so as to create an electric field region within the airflow passage; and
   a mechanical separator disposed within the airflow passage, downstream of the airflow mixer and axially at least partially within the electric field region, disposed to separate water droplets from air, wherein the mechanical separator is a swirler with a plurality of circumferentially distributed flow turning elements disposed to centrifugally separate water droplets from air.

2. The water separator of claim 1, wherein the electric plates are radially distributed annular plates.

3. The water separator of claim 2, wherein the electric plates are radially distributed such that cross-sectionals area between adjacent plates are the same.

4. The water separator of claim 1, wherein the electric plates are radially extending, circumferentially distributed vanes.

5. The water separator of claim 4, wherein the vanes are flow turning elements of the mechanical separator.

6. The water separator of claim 1, wherein the electric plates comprise a first plurality of radially extending, circumferentially distributed plates of alternating charge, and a second plurality of annular, radially distributed plates of alternating charge.

7. The water separator of claim 1, wherein the airflow mixer is a lobed mixer with an annular wave-shaped guide plate having a substantially uniform upstream radius and a downstream radius that varies as a function of circumferential position.

8. A method of separating water from humid air, the method comprising:
   flowing air axially through an annular air passage;
   introducing a non-axial flow component to airflow through the annular air passage via a mechanical mixer;
   polarizing and thereby coalescing water droplets downstream of the mechanical mixer via an electric field region produced by a plurality of plates of alternating electric charge; and
   mechanically separating coalesced water droplets via a mechanical swirler situated at least partly within the electric field region.

9. The method of claim 8, wherein polarizing water droplets comprises applying constant direct current of alternating sign to adjacent plates among the plurality of plates of alternating electric charge.

10. The method of claim 9, wherein polarizing water droplets comprises applying opposite phase alternating current to adjacent plates among the plurality of plates of alternating electric charge.

11. The method of claim 8, wherein the electric field region is a region of substantially constant electric field as a function of radius.

12. The method of claim 8, wherein the mechanical swirler includes a plurality of turning vanes, at least a subset of which are among the plurality of plates of alternating electric charge that produce the electric field region.

13. The method of claim 8, wherein introducing a non-axial component to airflow through the annular air passage comprises redirecting air via a lobed mixer with an annular wave-shaped guide plate having a substantially uniform upstream radius and a downstream radius that varies as a function of circumferential position.

14. A water separator comprises:
   an axially extending airflow passage;
   an airflow mixer disposed within the airflow passage, and configured to impart a non-axial flow component on airflow through the airflow passage;
   a plurality of electric plates of alternating charge, disposed within the airflow passage downstream of the airflow mixer so as to create an electric field region within the airflow passage, wherein the electric plates are radially extending, circumferentially distributed vanes; and
   a mechanical separator disposed within the airflow passage, downstream of the airflow mixer and axially at least partially within the electric field region, disposed to separate water droplets from air, wherein the vanes are flow turning elements of the mechanical separator.

* * * * *